(12) United States Patent
Chen et al.

(10) Patent No.: US 7,423,973 B2
(45) Date of Patent: Sep. 9, 2008

(54) METHODS AND APPARATUS FOR HYBRID MULTICAST AND UNICAST TRANSMISSIONS IN A DATA NETWORK

(75) Inventors: An Mei Chen, San Diego, CA (US); Ravinder Paul Chandhok, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 710 days.

(21) Appl. No.: 10/951,927

(22) Filed: Sep. 27, 2004

(65) Prior Publication Data

US 2005/0259584 A1 Nov. 24, 2005

Related U.S. Application Data

(60) Provisional application No. 60/572,453, filed on May 18, 2004.

(51) Int. Cl.
*G01R 31/08* (2006.01)
(52) U.S. Cl. .................. 370/238; 370/432; 370/300; 370/312; 370/473
(58) Field of Classification Search .............. 370/432, 370/300, 312, 473, 328
See application file for complete search history.

(56) References Cited

U.S. PATENT DOCUMENTS

2002/0065929 A1* 5/2002 Kamentsky et al. ......... 709/231
2002/0101872 A1 8/2002 Boivie
2003/0007499 A1* 1/2003 Rajahalme .................. 370/432
2003/0095561 A1* 5/2003 Hwang ....................... 370/432

FOREIGN PATENT DOCUMENTS

WO 0244912 6/2002

OTHER PUBLICATIONS

Birk and Crupnicoff, "A Multicast Transmission Schedule for Scalable Multi-Rate Distribution of Bulk Data Using Non-Scalable Erasure-Correcting Codes," *Proceedings of Infocom*, XP-002333702 (2003).
Clark and Ammar, "Providing Scalable Web Services Using Multicast Communication," *Computer Networks and ISDN Systems*, North Holland Publishing, Amsterdam, NL 29(7):841-858 (1997).
Poppe et al., "Guaranteeing Quality of Service to Packetised Voice Over the UMTS Air Interface,"*IEEE*, pp. 84-91 (Jun. 5, 2000).

* cited by examiner

*Primary Examiner*—Ricky Ngo
*Assistant Examiner*—Kibrom T Hailu

(57) ABSTRACT

Methods and apparatus for hybrid multicast and unicast transmissions in a data network. A method is provided for operating a server on a data network. The method includes computing a multicast cost indicator and a unicast cost indicator that are associated with multicast and unicast transmission of data. The method also includes determining that the multicast cost indicator is less than the unicast cost indicator, and generating a transmission schedule that describes when the data will be multicasted on the data network. The method also includes transmitting the transmission schedule, and multicasting the data according to the transmission schedule.

42 Claims, 6 Drawing Sheets

METHODS AND APPARATUS FOR HYBRID MULTICAST AND UNICAST TRANSMISSIONS IN A DATA NETWORK

CROSS REFERENCE TO RELATED APPLICATIONS

The present application claims the benefit of priority from a co-pending U.S. Provisional Patent Application entitled, "METHOD AND APPARATUS FOR HYBRID MULTICAST AND UNICAST TRANSMISSION" having Ser. No. 60/572,453 and filed on May 18, 2004, the disclosure of which is incorporated by reference herein in its entirety for all purposes.

BACKGROUND

I. Field

The present invention relates generally to content delivery in a network environment, and more particularly, to methods and apparatus for hybrid multicast and unicast transmissions in a data network.

II. Description of the Related Art

Data networks, such as wireless communication networks, have to trade off between services customized for a single terminal and services broadcasted/multicasted to all terminals. The distribution of content (data) to a large number of terminals (subscribers) is a complicated problem. Network systems that implement multicast technology can deliver data over a wide area, however, because it is difficult for the sender to know about the success or failure of such deliveries, the costs and resource utilization may be excessive and wasteful.

In one type of multicast transmission, one copy of the information is simultaneously transmitted to hundreds or thousands of receivers. To achieve transmission reliability, several techniques have been proposed that can be generally categorized into three approaches described as follows.

In the first approach, the sender maintains state information for each receiver of a multicast transmission by keeping track of an acknowledgement response (ACK) that it expects to receive from each receiver of the transmission. If the acknowledgement response is not received before expiration of a selected timeout interval, the sender retransmits the information to the multicast group. This approach does not scale well when the receiving population is very large, and is susceptible to the well known "ACK implosion" problem, where the sender is inundated with an overwhelming number of acknowledgement responses. In addition, the sender often does not know who the members (receivers) of the multicast group are, which makes it difficult for the sender to maintain state information for the receivers.

In the second approach, the scalability problem of the first approach is addressed by having each receiver transmit a negative acknowledgement signal (NACK) if the receiver does not obtain the information without error. A variation of this approach is to have an intermediate node aggregate NACK signals from the downstream nodes and forward only one NACK to the upstream node. The upstream node may then retransmit the information.

In the third approach, transmission reliability is achieved via redundancy. The simplest form of redundancy is repetition. Using repetition in the third approach, the same information is retransmitted several times. Another form or redundancy is to perform forward error correction (FEC) on the information to be transmitted. Using smart coding mechanisms the same reliability factor is achieved using less redundancy information.

However, in all the above approaches, a retransmission of data is sent to the entire set of receivers. This retransmission mechanism may work satisfactorily in a wire line network environment since only one copy of the information needs to be sent. The routing protocol within the network handles duplication of data packets to deliver the data to the branches of the distribution tree. In addition, the transmission of information to the leaves (last hop) of the tree is relatively inexpensive given the high bandwidth of the wire line network.

Unfortunately, unlike the wire line network, the last hop in a wireless network is the most expensive resource. This is the over-the-air resource between a Base Station Transceiver and a plurality of mobile terminals. A broadcast transmission in a wireless network is not subject to transmission power control since it is engineered to obtain a specific cell coverage and frame error rate. Thus, broadcasted transmissions in a wireless network utilize more power than a unicast transmission because of the larger coverage range that the broadcasted transmission is targeted to reach. As a result, a broadcast transmission is generally more expensive than a unicast transmission.

Furthermore, in wireless broadcast transmission the acknowledgment response from the receiving terminals is limited. Reliability is achieved by FEC or by repeat broadcasts. Unfortunately, even with high FEC or repeat broadcasts, some users may not be able to receive the data. For example, mobiles terminals that did not receive the data may be outside the broadcast zone, or their reception of the broadcast may be interrupted because of voice service handling. Thus, re-broadcasting the information would be wasteful because these terminals will not be able to receive the information. It would also be wasteful to re-broadcast information when the number of terminals not receiving the information is very small. For example, if high FEC is use to achieve reliability, the number of mobile terminals that are unable to accurately receive the information in a given sector may be very small. Thus, it would be wasteful to use the entire broadcast channel to re-broadcast the information to a small subset of mobile terminals.

Therefore, what is needed is a delivery system for use in network environments that operates to determine the most resource efficient and cost effective way to transmit data to a large number of receiving terminals. For example, the system should operate in a wireless network environment to determine if it is more efficient and/or cost effective to use unicast or multicast transmission techniques to transmit data to a large number of receiving terminals.

SUMMARY

In one or more embodiments, a data delivery system, comprising methods and apparatus, is provided that operates to efficiently deliver data to a plurality of terminals in a data network. In one embodiment, the system employs a hybrid of multicast and unicast transmissions to delivery data (or content) to the terminals. The system is especially well suited for use in wireless networks where wireless transmission of data from a base station to multiple mobile terminals utilizes expensive over-the-air resources.

In one embodiment, a sender in the system uses various parameters to determine the cost of sending data using either multicast or unicast transmissions to a plurality of terminals in a network. Based on which transmission technique is less expensive, the sender generates a transmission schedule which identifies how and when the data will be transmitted. If the data is to be multicasted, the sender multicasts the data according to the transmission schedule. If a terminal is not able to receive the data when it is transmitted, the terminal may request to establish a unicast session with the sender to retrieve the data. In one embodiment, after the sender multicasts data to the terminals, the sender may again use a transmission cost analysis to determine how any re-transmissions are performed. Thus, the system avoids costly re-broadcasts of the data to all the terminals if less expensive unicast sessions would deliver the data to enough terminals to satisfy the desired quality of service requirements. As a result, precious air-link resources are efficiently utilized because wasteful re-broadcasts of the data are avoided.

In one embodiment, a method is provided for operating a server on a data network. The method comprises computing a multicast cost indicator and a unicast cost indicator that are associated with multicast and unicast transmission of dat. The method also comprises determining that the multicast cost indicator is less than the unicast cost indicator, and generating a transmission schedule that describes when the data will be multicasted on the data network. The method also comprises transmitting the transmission schedule, and multicasting the data according to the transmission schedule.

In one embodiment, apparatus is provided for use in a server on a data network. The apparatus comprises a cost estimator that operates to compute a multicast cost indicator and a unicast cost indicator that are associated with multicast and unicast transmission of data. The apparatus also comprises processing logic that operates to determine that the multicast cost indicator is less than the unicast cost indicator, and generate a transmission schedule that describes when the data will be multicast on the data network. The apparatus also comprises transmitting logic that operates to transmit the transmission schedule, and multicasts the data according to the transmission schedule.

In one embodiment, apparatus is provided for use in a server on a data network. The apparatus comprises means for computing a multicast cost indicator and a unicast cost indicator that are associated with multicast and unicast transmission of data, and means for determining that the multicast cost indicator is less than the unicast cost indicator. The apparatus also comprises means for generating a transmission schedule that describes when the data will be multicasted on the data network, and means for transmitting the transmission schedule. The apparatus also comprises means for multicasting the data according to the transmission schedule.

In one embodiment, a computer-readable media comprising instructions, which when executed by processing logic in a server, operate to transmit data on a data network. The computer-readable media comprises instructions for computing a multicast cost indicator and a unicast cost indicator that are associated with multicast and unicast transmission of data, and instructions for determining that the multicast cost indicator is less than the unicast cost indicator. The computer-readable media also comprises instructions for generating a transmission schedule that describes when the data will be multicasted on the data network, and instructions for transmitting the transmission schedule. The computer readable media also comprises instructions for multicasting the data according to the transmission schedule.

In one embodiment, a method is provided for operating a receiving terminal on a data network. The method comprises receiving a transmission schedule that describes how data will be transmitted. The method also comprises determining that the data is to be multicasted on the data network in one or more multicast cycles, and receiving the multicasted data during the one or more multicast cycles.

In one embodiment, apparatus is provided for use in a receiving terminal on a data network. The apparatus comprises logic to receive a transmission schedule that describes how data will be transmitted. The apparatus also comprises logic to determine that the data is to be multicasted on the data network in one or more multicast cycles, and logic to receive the multicasted data during the one or more multicast cycles.

Other aspects, advantages, and features of the present invention will become apparent after review of the hereinafter set forth Brief Description of the Drawings, Detailed Description, and the claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of a data delivery system that operate to efficiently deliver data from a transmitting server to a plurality of terminals in a wireless network. In one embodiment, the system utilizes a hybrid transmission technique that combines multicast and unicast transmissions to efficiently delivery data to the terminals. The system is especially well suited for use in wireless networks environments, but may be used in any type of network environment, including but not limited to, communication networks, public networks, such as the Internet, private networks, such as virtual private networks (VPN), local area networks, wide area networks, long haul network, or any other type of data network.

In the following description, a multicast transmission is defined to cover transmissions in one or more of the following categories.
1. One-to-Many (one sender and many receivers)
2. Many-to-Many (many senders and many receivers)
3. Many-to-One (many senders and one receiver)

Thus, a "broadcast" transmission is generally defined as the first type of multicast transmission. However, the term "broadcast" is also used within this document to mean a transmission within any of the identified multicast categories.

Figure 1:
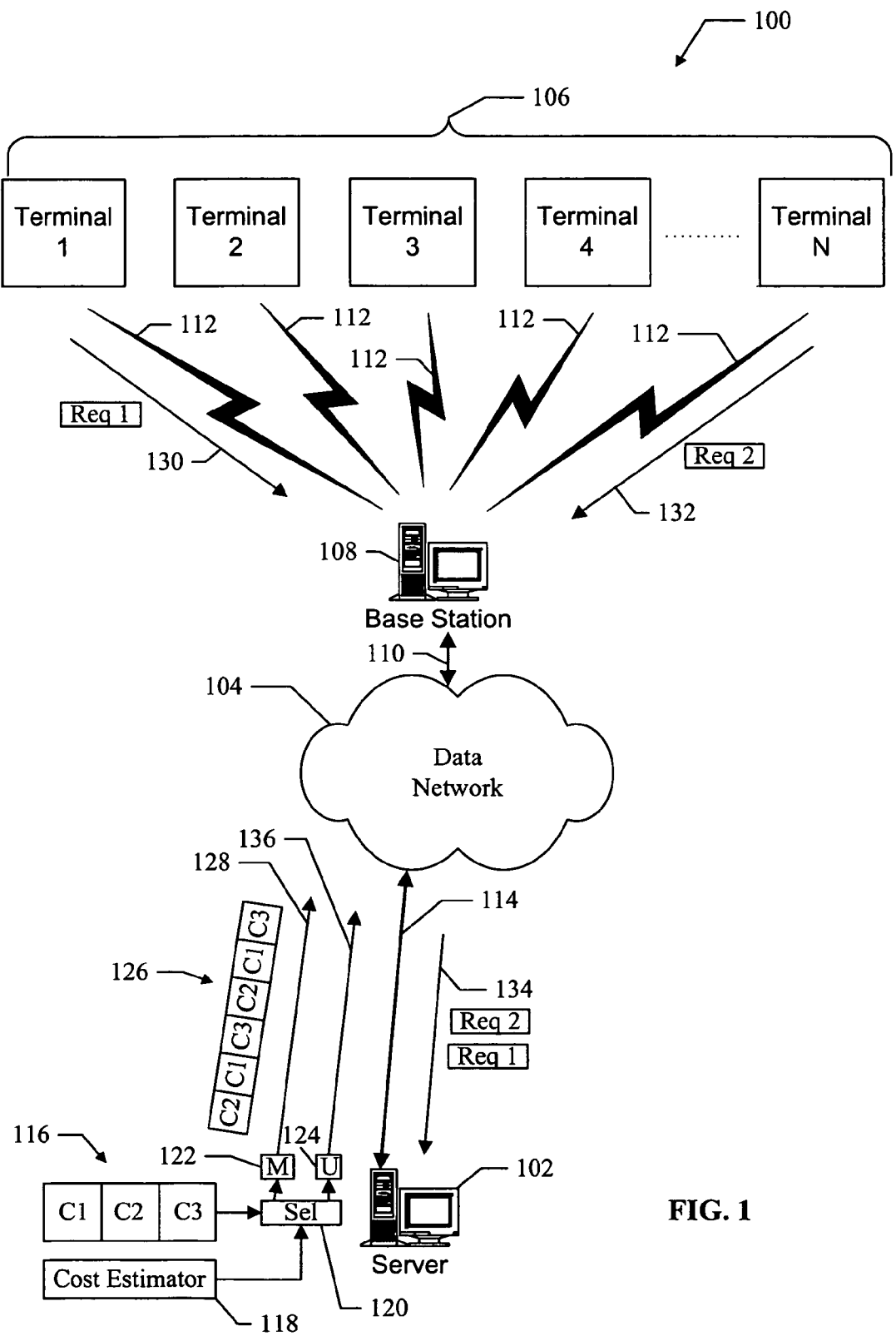
FIG. 1 shows a data network that comprises one embodiment of a data delivery system.

FIG. 1 shows a data network 100 that comprises one embodiment of a data delivery system. The network 100 comprises a server 102, a data network 104, and terminals (1 thru N), as shown at 106. The data network 104 may be any type and/or combination of wired and wireless networks that allow data to be transmitted between the server 102 and the terminals 106. The network 104 includes a base station 108 that is coupled to the network 104 via the communication channel 110. The communication channel 110 may be any type of wired or wireless communication channel that allows the base station 108 to communicate over the data network 104. The base station is in communication with the terminals 106 via wireless communication links 112 that allow data to be wirelessly transmitted between the base station 108 and the terminals 106. In one embodiment, the wireless communication links 112 comprise forward communication channels, reverse communication channels, control channels, and any other type of communication channel that may be used to communicate information between the base station 108 and the terminals 106.

The server 102 communicates with the data network 104 via communication link 114, which may be a wired and/or wireless communication link. For the purpose of this description, it will be assumed that the server 102 includes three data files 116 (or "content files") C1, C2, C3, which may be of any type or format. In one or more embodiments of the data delivery system, the data files 116 are efficiently transmitted by the server 102 to the terminals 106 via the network 104.

In one embodiment, the server 102 includes a cost estimator 118 that calculates transmission cost estimates related to the cost of transmitting the data 116 in both multicast and unicast transmissions from the server 102. For example, the cost estimator 118 operates to calculate a multicast cost indicator and a unicast cost indicator, which can be compared to determine the lower cost transmission technique. The cost estimator uses various network and system parameters to determine the transmission cost estimates.

The costs estimates output from the cost estimator 118 are input to selection logic 120, which selects between multicast 122 and unicast 124 transmission logic to transmit the data to the terminals 106. In one embodiment, the selection logic 120 selects the least expensive transmission technique based on the cost estimates.

To provide a selected level of service, the server 102 operates to determine a reliability factor that indicates the reliability with which it desires to deliver the data. Based on the reliability factor, a selected level of FEC is applied to the data 116, and the resulting encoded data is interleaved to produce a data stream 126 that is transmitted to the terminals 106 using the selected transmission technique.

Prior to transmission, the server 102 operates to generate a transmission schedule that describes how and when the data will be transmitted to the terminals 106. The server 102 transmits the transmission schedule to the terminals 106 so that they will know in advance how the data is to be transmitted. The delivery of the transmission schedule may be performed using any type of transmission channel, including but not limited to, any control channel, out-of-band channel, or any other type of transmission channel between the server 102 and the terminals 106. If the data is to be unicasted to the terminals, the transmission schedule provides a time window when the terminals 106 may establish unicast sessions with the server to retrieve the data 116. If the data is to be multicasted to the terminals, the transmission schedule identifies when the data 116 will be multicasted, so that the terminals can listen at the appropriate time to receive the data.

If the data is multicasted, any terminal not receiving the data may request to receive the data via a unicast transmission. For example, a terminal may be out of a selected transmission range, be experiencing transmission interference, or be providing another service that prevents reception of the multicasted data. For example, in FIG. 1, it will be assumed that terminals 1 and N did not receive the multicasted data, and so these terminals send requests (Req1 and Req2, respectively) to the server 102 as shown at paths 130, 132, and 134. The requests are requests to establish a unicast session with the server 102, so that the data may be retrieved by the terminals 1 and N using unicast transmissions.

In one embodiment, after the data is multicasted, the server 102 receives a number of requests to establish unicast sessions with the terminals 106. After the server 102 receives the requests, the cost estimator 118 again calculates whether it is more cost effective to retransmit the data using a multicast transmission or establish the required number of unicast sessions to satisfy all the requests. After the determination is made, the data is then re-transmitted using the most cost efficient method. For example, if a re-broadcast using a multicast transmission is the most cost effective, a new transmission schedule is generated and sent to the terminals prior to the re-broadcast. If unicast sessions are the most cost effective, the server 102 operates to establish the required number of unicast sessions necessary to satisfy the requests it has received.

Thus, in one or more embodiments, the data delivery system operates to determine the most cost efficient method for transmitted data to terminals on a data network. The determination may also be made with regards to any re-transmissions of the data until the data is provided to enough terminals that a selected level of service has been achieved. As a result, embodiments of the data delivery system provide a hybrid transmission system since the same data may be both multicast and unicast based on the most efficient method of transmission given any particular network environment.

Figure 2:
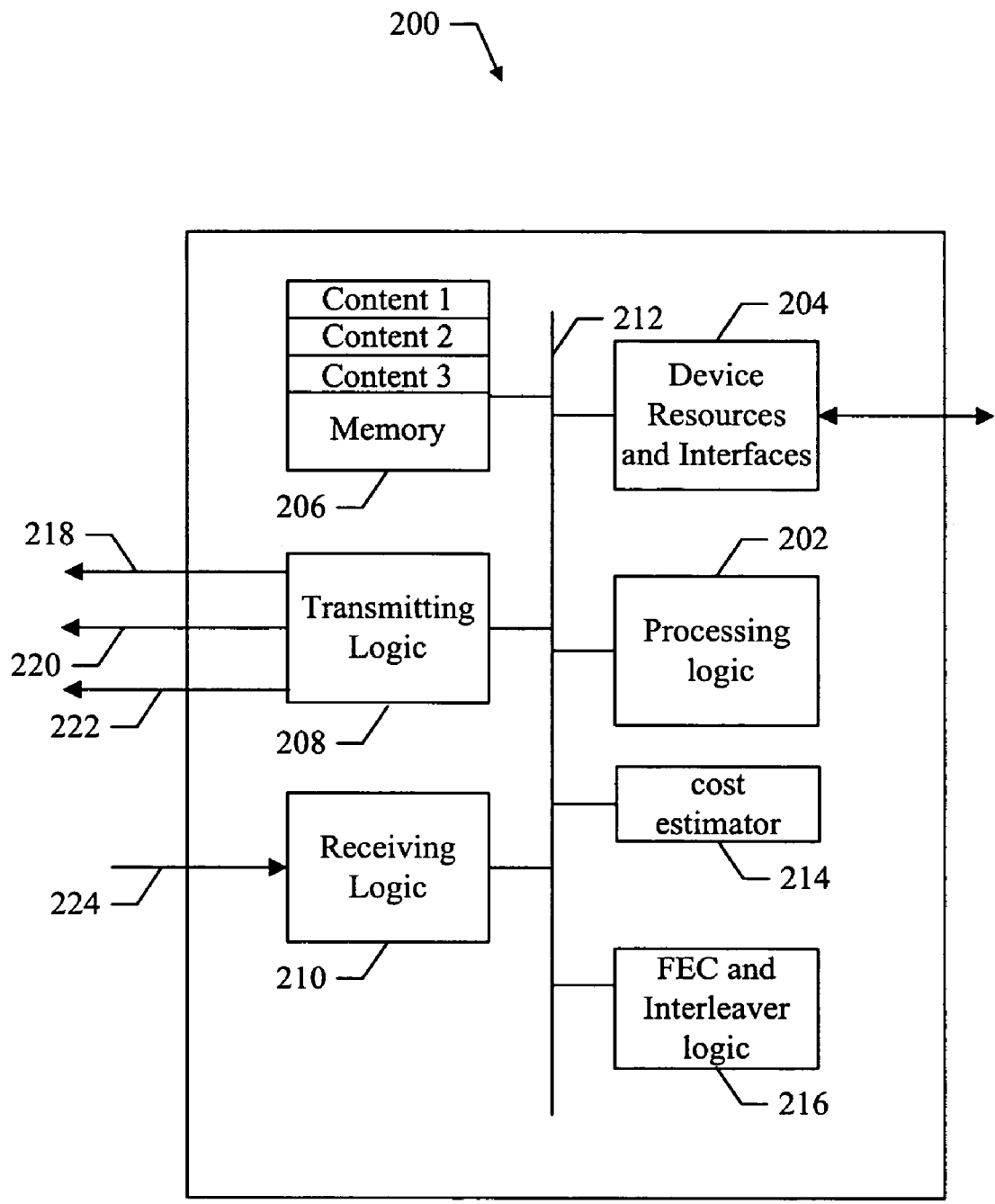
FIG. 2 shows a detailed diagram of one embodiment of a transmitting server suitable for use in one embodiment of a data delivery system.

FIG. 2 shows a detailed diagram of one embodiment of a transmitting server 200 suitable for use in one embodiment of a data delivery system. For example, the server 200 may be the server 102 in FIG. 1. The server 200 comprises processing logic 202, device resources 204, data memory 206, transmitting logic 208, and receiving logic 210, all coupled to an internal data bus 212. The server 200 also comprises cost estimator 214 and FEC/interleaver logic 216, which are also coupled to the data bus 212.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and to control one or more other functional elements of the server 200 via the internal data bus 212.

The device resources and interfaces 204 comprise hardware and/or software that allow the server 200 to communicate with internal and external systems. For example, internal systems may include mass storage systems, memory, display driver, modem, or other internal device resources. The external systems may include user interface devices, printers, disk drives, or other local devices or systems.

The data memory 206 comprises any type of memory device and includes data (or content) to be transmitted to one or more terminals on a data network. For example, the content may comprise multimedia content or any other type of content.

The transmitting logic 208 comprises hardware and/or software that operates to allow the server 200 to transmit data or other information to remote devices or systems. For example, in one embodiment, the transmitting logic 208 comprises multicast logic that operates to multicast data and/or other information over a multicast channel 218 to remote devices, such as mobile terminals. For example, the multicast logic allows the server 200 to transmit a multicast transmission over a data network to a plurality of remote terminals. The transmitting logic 208 also comprises unicast logic that operates to unicast data and/or other information over a unicast channel 220 to remote devices, such as remote terminals. For example, the unicast logic allows the server 200 to establish one or more unicast sessions to transmit data over the unicast channel 220 to one or more remote terminals. The transmitting logic 208 also comprises control channel logic to transmit control information over a control channel 222 to remote devices. The control channel logic may comprise any suitable hardware and/or software and implement any type of control channel suitable for transmitting information from the server 200 to one or more remote terminals.

The receiving logic 210 comprises hardware and/or software that operates to allow the server 200 to receive data and other information from remote devices via a receiving channel 224. For example, the receiving logic 210 interfaces to a data network via the receiving channel 224 to allow the server 200 to receive data requests that have been transmitted from remote terminal devices.

The cost estimator logic 214 comprises a CPU, processor, gate array, hardware logic, memory elements, virtual machine, software, and/or any combination of hardware and software. The cost estimator 214 operates to calculate the costs of multicast and unicast transmissions of content over a data network to a plurality of remote terminals. For example, the cost estimator uses a variety of parameters to calculate cost indicators that include a multicast cost indicator and a unicast cost indicator that indicate the cost for multicast and unicast transmissions. The cost parameters include, but are not limited to, actual cost, bandwidth utilization, network utilization, location, delay, power, and any other resource usage or cost parameter. In one embodiment, the cost parameters may vary from application to application, however, any cost calculating function may be utilized. The cost indicators output from the cost estimator 214 can be used to determine whether a multicast or unicast of data provides the least expensive method of transmitting the data to the remote terminals.

The FEC/interleaver logic 216 comprises a CPU, processor, gate array, hardware logic, memory elements, virtual machine, software, and/or any combination of hardware and software. The FEC/interleaver 216 operates to provide FEC to the content to be transmitted so that the content may be delivered with a selected quality of service (QoS) level. In one or more embodiments, the FEC/interleaver 216 may provide any type of FEC to the content to be transmitted. Additionally, the FEC/interleaver 216 also operates to interleave multiple content files to provide diversity and prevent head of the line (HOL) blocking. Thus, the FEC/interleaver 216 may provide any suitable interleaving technique to provide transmission diversity.

The server 200 is suitable for use in one or more embodiments of a data delivery system to efficiently deliver data over a data network to a plurality of terminals. During operation, the server 200 has content (1, 2, 3) stored in the data memory 206 to be delivered to the receiving terminals. The cost estimator logic 214 is used to estimate cost indicators that indicate the costs associated with transmitting the content using multicast and unicast transmissions. The processing logic 202 receives the cost indicators from the cost estimator 214, and selects the least expensive transmission technique for transmitting the content to the remote terminals. In one embodiment, the processing logic 202 generates a transmission schedule that described how and when the content is be transmitted to the remote terminals. For example, in one embodiment, the transmission schedule describes when one or more multicasts of the content will be transmitted by the server for reception by the remote terminals. In another embodiment, the transmission schedule describes a window when terminals are allowed to establish a unicast session with the server for the purpose of retrieving the content. A more detailed description of the operation of the data delivery system and the operation of the server 200 is provided in another section of this document.

In one embodiment, the data delivery system comprises program instructions stored on a computer-readable media, which when executed by the processing logic 202, provides the functions of the server 200 described herein. For example, instructions may be loaded into the server 200 from a computer-readable media, such as a floppy disk, CDROM, memory card, FLASH memory device, RAM, ROM, or any other type of memory device or computer-readable media that interfaces to the server 200 via the device resources 204. In another embodiment, the instructions may be downloaded into the server 200 from a network resource that interfaces to the sever 200 via the receiving logic 210. The instructions, when executed by the processing logic 202, provide one or more embodiments of a data delivery system as described herein.

Figure 3:
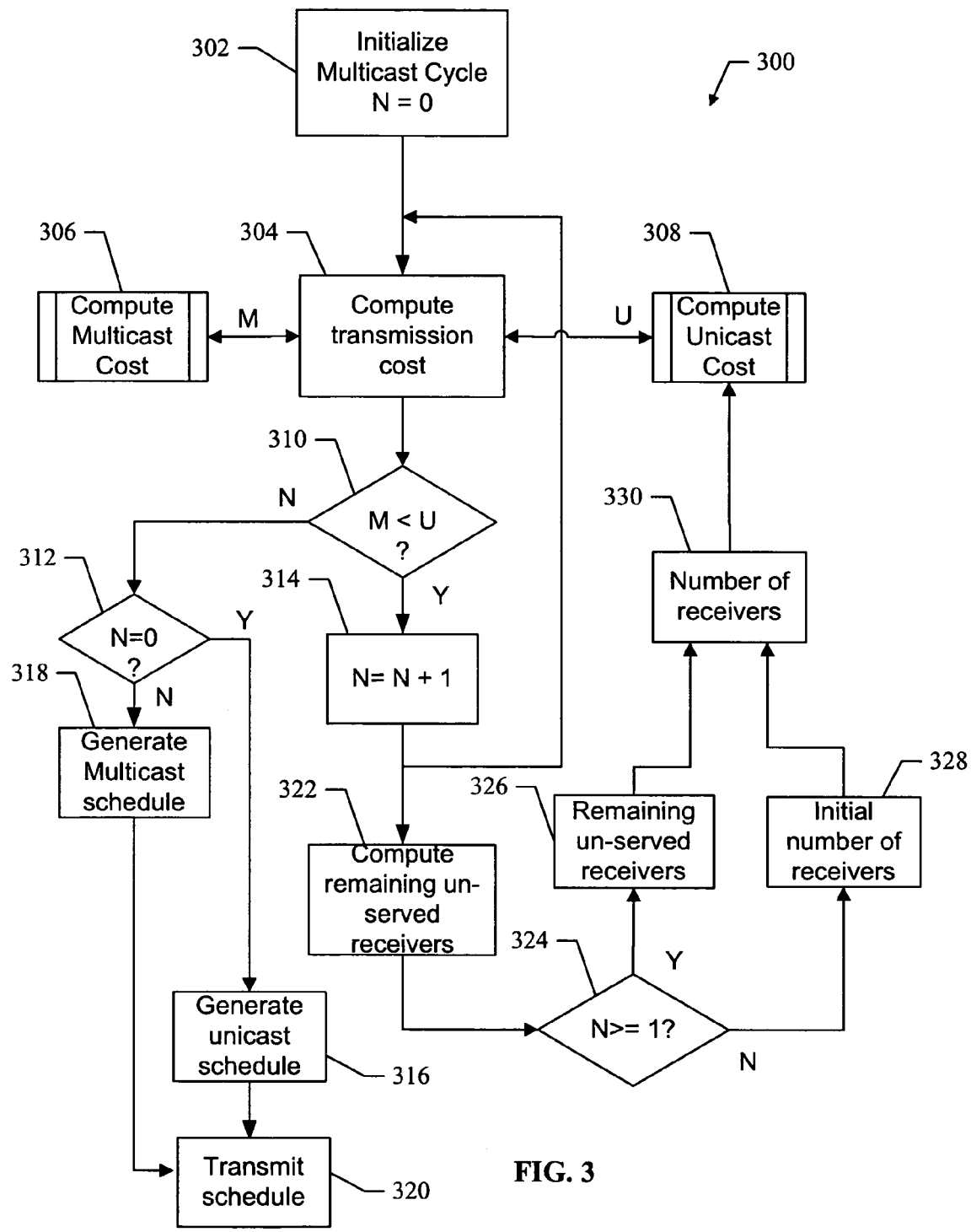
FIG. 3 shows one embodiment of a method for operating a server in one embodiment of a data delivery system.

FIG. 3 shows one embodiment of a method 300 for operating a server in one embodiment of a data delivery system. For clarity, the method 300 will be described with reference to the server 200 shown in FIG. 2. In one or more embodiments, the processing logic 202 executes program instructions to perform the functions described below.

At block 302, a multicast cycle indicator (N) is initialized. For example, the multicast cycle indicator (N) is initialized to zero. In one embodiment, the cycle indicator N is stored and initialized by the processing logic 202 and indicates the number of multicast transmission cycles to be used to transmit the data to remote terminals.

At block 304, the server computes the cost of unicast (U) and multicast (M) transmissions of content to be transmitted to a plurality of remote terminals. The cost of multicast transmissions is computed at block 306, and the cost of unicast transmissions is computed at block 308. The computations for each transmission type require inputs such as usage data, receiver's outage probability, frame error rate, number of subscribers, FEC, protocol overhead, and etc. For example, the cost estimator 214 operates to compute a multicast cost indicator and a unicast cost indicator.

At block 310, a test is performed to compare the cost of multicast (M) and unicast (U) transmissions. For example, the test is performed by the processing logic 202 based on cost indicators received from the cost estimator 214. If the test determines that it is more cost effective to send the content using unicast transmissions, the method proceeds to block 312. If the test determines that it is more cost effective to send the content using a multicast transmission, the method proceeds to block 314.

At block 312, a test is performed to determine whether the method is at the initial multicast cycle, such that no multicasts have been scheduled. For example, the test is performed by the processing logic 202. If the multicast cycle is set to its initial value of zero, then no multicasts have been scheduled and the method proceeds to block 316. If the multicast cycle is set to a number other than zero, then one or more multicast transmissions have already been scheduled and the method proceeds to block 318.

At block 316, a unicast transmission schedule is generated so that the content may be transmitted to the remote terminals using unicast transmission. For example, the cost analysis done by the processing logic 202 has determined that it is more cost effective to transmit the content using unicast transmissions. In one embodiment, the processing logic 202 generates a transmission schedule that includes a contact window for remote terminals to retrieve the content using unicast transmissions. The contact window specifies the time interval that a remote terminal can set up a unicast session with the server to retrieve the content. The processing logic 202 operates to establish unicast sessions with the remote terminals and the content is transmitted to those terminals using the transmitting logic 208 and the unicast channel 220. The method then proceeds to block 320 where the transmission schedule is transmitted to the terminals using the control channel 222 and the data is transmitted accordingly.

At block 318, one or more multicast cycles have been scheduled since the cycle indicator N is not equal to zero. Thus, the processing logic 202 has computed the number of multicast cycles needed to transmit the content to the majority of terminals, but has determined that unicast transmissions would be more cost effective to transmit the content to enough additional terminals to achieve a desired level of service. The processing logic 202 generates a transmission schedule describing when each multicast cycle will take place. The transmission schedule will be transmitted to the remote terminals so that they may listen for the multicasts at the appropriate time. Prior to the actual multicast, FEC may be applied to the content and if there are multiple content files to be transmitted, interleaving of multicast cycles from one content file with multicast cycles from other content files is performed by the FEC/interleaving logic 216 to improve the performance of the system.

If one or more remote terminals do not receive the content after all the multicasts have completed, then those terminals may request unicast sessions to retrieve the content from the server. Thus, the data delivery system operates to allow one or more multicasts to efficiently transmit data to remote terminals. Those terminals not receiving the multicasts may then request unicast session to retrieve the data from the server. As a result, the system operates to provide the most cost effective way to transmit data using a hybrid of multicast and unicast transmissions.

At block 314, the multicast cycle N is incremented by 1. For example, the processing logic 202 increments the multicast cycle N and stores the value. At this point, one or more multicasts will be used to transmit content to the remote receivers. The method then proceeds back to block 304 where new cost indicators are computed to determine if additional multicasts will be scheduled. However, in a parallel process, a new computation of the cost of unicast transmissions is performed starting at block 322.

At block 322, the number of remote terminals for which the network will not be able to reach during the previously calculated multicast cycle are computed. For example, the processing logic 202 performs the functions at blocks 322 through 330 to determine the number of unserved remote terminals that will not have received the content after any scheduled multicasts. After the number of unserved terminals is computed, the method returns to block 304 to repeat the process of calculating the cost of multicast and unicast transmissions. For example, after three multicast cycles, there, may still be unserved terminals that have not received the data. During the next cost calculations at block 304, it may be determined that another multicast of the content would be more expensive than establishing unicast sessions with the unserved terminals. In such a case, the method would proceed to block 318 where the multicast schedule is generated and the multicasts are thereafter performed. Any remaining unserved terminal would be able to establish a unicast session to retrieve the data.

It should be noted that the method 300 illustrates just one embodiment and that changes, additions, or rearrangements of the flow elements may be made without deviating from the scope of the described embodiments.

Figure 4:
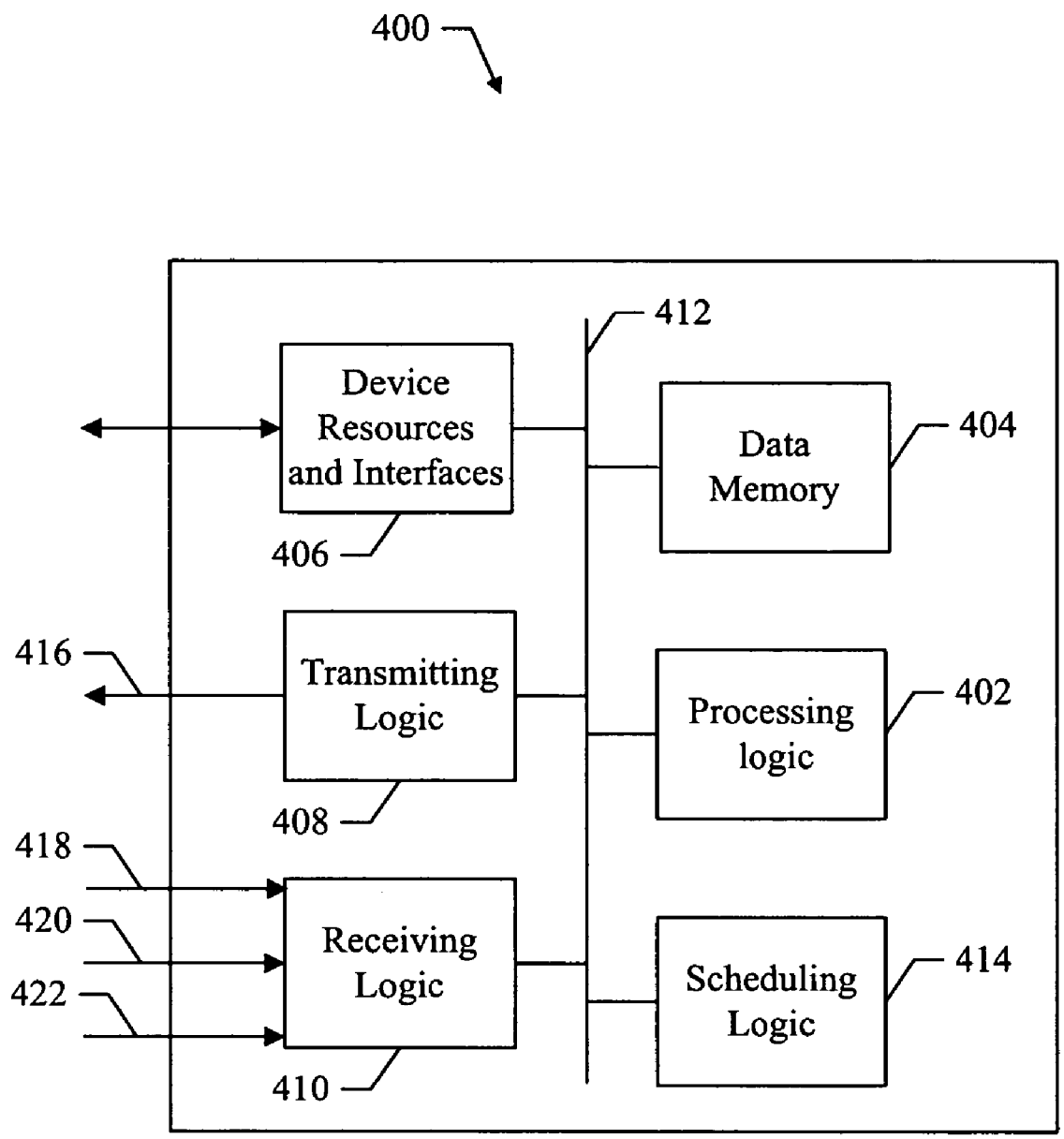
FIG. 4 shows a detailed diagram of one embodiment of a terminal suitable for use in one embodiment of a data delivery system.

FIG. 4 shows a detailed diagram of one embodiment of a terminal 400 suitable for use in one embodiment of a data delivery system. The terminal 400 comprises processing logic 402, data memory 404, device resources and interfaces 406, transmitting logic 408 and receiving logic 410, all coupled to a data bus 412. The terminal 400 also comprises scheduling logic 414, which is also coupled to the data bus 412.

In one or more embodiments, the processing logic 402 comprises a CPU, processor, gate array, hardware logic, memory elements, virtual machine, software, and/or any combination of hardware and software. Thus, the processing logic 402 generally comprises logic to execute machine-readable instructions and to control one or more other functional elements of the terminal 400 via the internal data bus 412.

The device resources and interfaces 406 comprise hardware and/or software that allow the terminal 400 to communication with internal and external systems. For example, internal systems may include mass storage systems, memory, display driver, modem, or other internal device resources. The external systems may include user interface devices, printers, disk drives, or other local devices or systems.

The transmitting logic 408 comprises hardware and/or software that operates to allow the terminal 400 to transmit data and other information to external devices or systems. For example, the transmitting logic 408 may comprise logic to transmit data and/or other information over a data network to other devices, such as server. For example, the processing logic 402 may use the transmitting logic 408 to transmit a request to a server to establish a unicast session in a data network.

The receiving logic 410 comprises hardware and/or software that operates to allow the terminal 400 to receive data and other information from remote devices or systems. For example, in one embodiment, the receiving logic 410 comprises multicast receiving logic that operates to receive data and/or other information multicasted over a multicast channel 418 from remote devices, such as a network server. For example, the multicast receiving logic allows the terminal 400 to receive a multicast transmission over a data network from a network server. The receiving logic 410 also comprises unicast logic that operates to receive unicast data and/or other information over a unicast channel 220 from a remote server. For example, the unicast logic allows the terminal 400 to establish one or more unicast sessions to receive data over the unicast channel 220 from a remote server. The receiving logic 408 also comprises control channel logic to receive control information from a remote server over a control channel 422. The control channel logic may comprise any suitable hardware and/or software and implement any type of control channel suitable for receiving information from a remote server.

The data memory 404 comprises any type of memory suitable for storing information at the terminal 400. For example, the terminal 400 may receive content that was transmitted in a multicast transmission from a server. In one embodiment, the processing logic 402 operates to store the content in the memory 404 for further processing.

The scheduling logic 414 operates to schedule the reception of data from a remote server. For example, the scheduling logic 414 may receive a transmission schedule from a remote server via the control channel 422. The transmission schedule describes how and when data will be transmitted from a server for reception by the terminal 400. If the transmission schedule identifies a time window that the data may be retrieved in a unicast session, the scheduling logic 414 alerts the processing logic 402 to establish a unicast session with the server to retrieve the data within the time window. If the transmission schedule indicates that the data will be multicasted in one or more multicast cycles, the scheduling logic 414 alerts the processing logic 402 to listen for the data multicasts at the appropriate time.

During operation, the terminal 400 operates according to one or more embodiments of a data delivery system to receive data that is efficiently transmitted from a transmitting server on a data network. The terminal 400 receives a transmission schedule from the server via the control channel 422. The processing logic 402 processes the transmission schedule and determines if the data is to be multicast or unicast to the terminal. If the data is to be unicast, the transmission schedule indicates a time window when the terminal 400 should establish a unicast session to retrieve the data. If the data is to be multicasted, the transmission schedule indicates when one or more multicasts of the data will occur. In one embodiment, the scheduling logic 414 operates to process the received transmission schedule so that the terminal 400 will be able to obtain the data based on the identified transmission technique.

If the data is multicasted and not received at the terminal 400 by the end of the multicast schedule, the processing logic 402 requests a unicast session with the server to retrieve the data. Thus, embodiments of the data delivery system allow the transmitting server to transmit the data in the most resource efficient and cost effective manner and the terminal 400 operates to receive those transmissions.

In one embodiment, the data delivery system comprises program instructions stored on a computer-readable media, which when executed by the processing logic 402, provides the functions of the terminal 400 described herein. For example, instructions may be loaded into the terminal 400 from a computer-readable media, such as a floppy disk, CDROM, memory card, FLASH memory device, RAM, ROM, or any other type of memory device or computer-readable media that interfaces to the terminal 400 via the device resources 406. In another embodiment, the instructions may be downloaded into the terminal 400 from a network resource that interfaces to the terminal 400 via the receiving logic 410. The instructions, when executed by the processing logic 402, provide one or more embodiments of a data delivery system as described herein.

Figure 5:
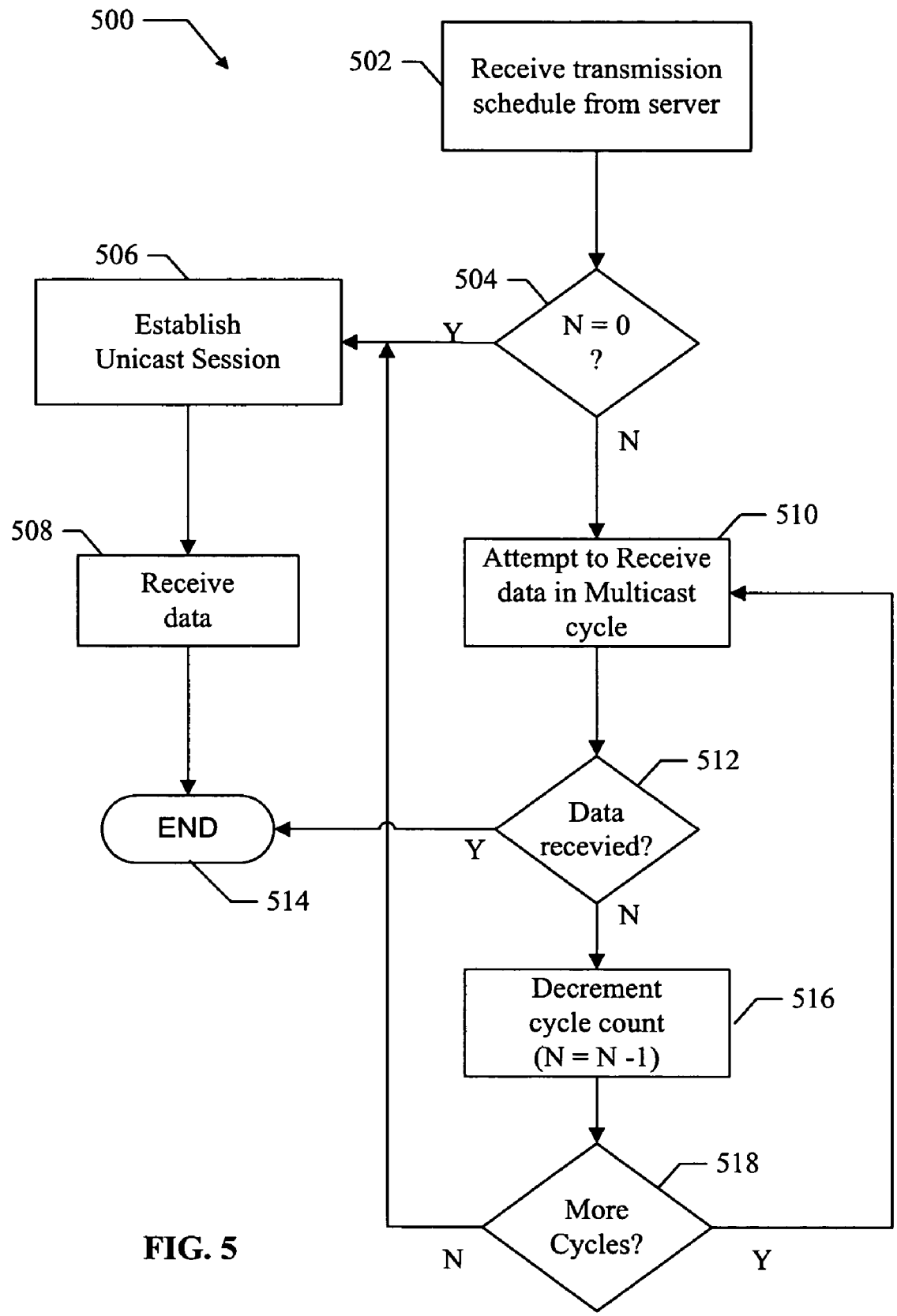
FIG. 5 shows one embodiment of a method for operating a terminal in one embodiment of a data delivery system.

FIG. 5 shows one embodiment of a method 500 for operating a terminal in one embodiment of a data delivery system. For clarity, the method 500 will be described with reference to the terminal 400 shown in FIG. 4. In one or more embodiments, the processing logic 402 executes program instructions to perform the functions described below.

At block 502, a transmission schedule is received at the terminal from a server in a data network. For example, the processing logic 402 receives the transmission schedule via the control channel 422 of the receiving logic 410. In one embodiment, the transmission schedule describes when and how many times content will be multicast from the server so that it may be received by the terminal. If the content is to be unicast to the terminal, the transmission schedule describes a time window when the terminal may establish a unicast session to retrieve the data from the server.

At block 504, a test is performed to determine if the content will be multicast to the terminal. For example, the processing logic 402 performs this test using information received in the transmission schedule. If the content is to be multicast, a multicast cycle indicator N will be greater then zero, and the method proceeds to block 508. If the multicast cycle indicator N is equal to zero, the content is to be transmitted via a unicast session, and the method proceeds to block 506.

At block 506, a unicast session is established between the terminal and the transmitting server so that the data may be transmitted to the terminal. For example, the scheduling logic 414 schedules a time when the unicast session may be established based on time window contained in the received transmission schedule. The scheduling logic 414 notifies the processing logic 402 about the scheduled unicast time and the processing logic 402 uses the transmitting logic 416 to request a unicast session with the server. The receiving logic 410 then establishes the unicast session with the server via the unicast channel 420.

At block 508, the terminal retrieves the data via the unicast session. For example, the processing logic 402 retrieves the data via the unicast channel 420 and stores the retrieved data in the data memory 404. After the data is received, the method ends at block 514.

At block 504, if it is determined that the data is to be multicasted to the terminal such that the multicast cycle indicator N is not equal to zero, the method proceeds to block 508.

At block 508, the terminal attempts to receive the data during a multicast cycle. For example, the scheduling logic 414 indicates to the processing logic 402 when the data will be multicasted from the server. The processing logic 402 controls the receiving logic 410 to receive the multicast via the multicast channel 418.

At block 512, a test is performed to determine if the terminal was able to receive the data during the previous multicast cycle. For example, the processing logic 402 determines if the data was accurately received. In one embodiment, the data is encoded with FEC and/or interleaved. The processing logic 402 operates to reverse these operations to determine if the data was received without errors. If the data was received without errors, the method ends at block 514. If the data was not accurately received during the previous multicast cycle, the method proceeds to block 516.

At block 516, the multicast cycle indicator N is decremented. For example, the processing logic 402 decrements the cycle indicator so that it indicates the next multicast cycle to be received.

At block 518, a test is performed to determine if any more multicast cycles remain. For example, the if the multicast cycle indicator N is zero, no more multicast cycles exist and the method proceeds to block 506 where the terminal establishes a unicast session with the transmitting server to retrieve the data. If the cycle indicator N is no zero, more multicast cycles will be performed and the method proceeds to block 508 where the terminal 400 attempts to accurately receive the multicasted data in the next multicast cycle.

The method proceeds until the data is either received via a multicast transmission or received via a unicast transmission. Thus, the method 500 operates to allow a terminal to receive data that has been efficiently transmitted in one embodiment of a data delivery system. It should be noted that the method 500 illustrates just one embodiment and that changes, additions, or rearrangements of the flow elements may be made without deviating from the scope of the described embodiments.

Figure 6:
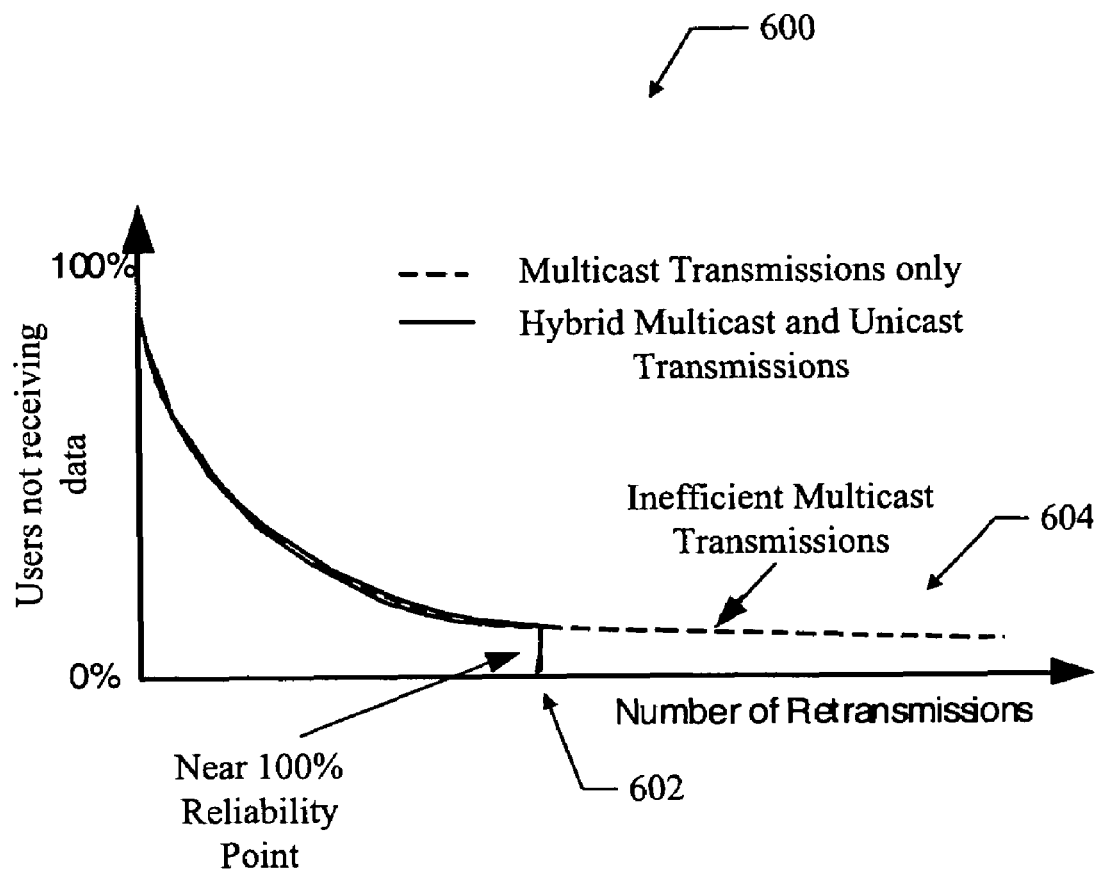
FIG. 6 shows a graph that illustrates the cost and resource efficiency achieved utilizing one or more embodiments of the described data delivery system.

FIG. 6 shows a graph 600 that illustrates the cost and resource efficiency achieved utilizing one or more embodiments of the data delivery system. For example, the graph 600 illustrates that there is a diminishing return with continued multicast transmissions after a certain number of multicast cycles. The graph 600 illustrates that during initial multicast transmission cycles the number of terminals not receiving the data decreases until point 602 is reached. In accordance with one or more embodiments of the data delivery system, the costs associated with additional multicast transmissions exceed the cost associated with unicast transmission after point 602 is reached. Thus, continued multicast transmissions will be very inefficient because the network's significant multicast resources will be used to reach only a few terminals, as shown by the graph at 604.

However, by providing a system that allows the unserved terminals to establish unicast sessions to retrieve the data, the system achieve near 100% reliability, as shown at point 602. Thus, in one or more embodiments, the data delivery system provides for hybrid transmission of data that results in extremely efficient data distribution.

Accordingly, while one or more embodiments of a data delivery system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for operating a server on a data network, the method comprising:
   computing a multicast cost indicator and a unicast cost indicator that are associated with multicast and unicast transmission of data;
   determining a number of unserved terminals when the multicast cost indicator is less than the unicast cost indicator;
   recomputing the unicast cost indicator based on the number of unserved terminals;
   generating a transmission schedule that describes when the data will be multicasted on the data network, wherein the transmission schedule schedules a first multicast transmission and a second multicast transmission when the multicast cost indicator is less than the computed unicast cost indicator and the recomputed unicast cost indicator;
   transmitting the transmission schedule; and
   multicasting the data according to the transmission schedule.

2. The method of claim 1, wherein the step of transmitting the transmission schedule comprises a step of transmitting the transmission schedule via a control channel.

3. The method of claim 1, further comprising receiving a request to establish a unicast session.

4. The method of claim 1, wherein the step of generating the transmission schedule comprises generating the transmission schedule to describe that the data will be multicasted on the data network in a plurality of multicast cycles.

5. The method of claim 1, wherein the step of generating the transmission schedule comprises:
   repeating the steps of determining a number of unserved terminals when the multicast cost indicator is less than the unicast cost indicator, and recomputing the unicast cost indicator based on the number of unserved terminals, until the unicast cost indicator is less than the multicast cost indicator;
   generating the transmission schedule to describe that the data will be multicasted on the data network in the plurality of multicast cycles.

6. The method of claim 1, wherein the step of multicasting further comprises performing any combination of encoding the data with FEC and interleaving the data.

7. The method of claim 1, further comprising:
   generating the transmission schedule to describe a time window when a unicast session may be established to retrieve the data when the multicast cost indicator is greater than the unicast cost indicator.

8. The method of claim 1, wherein the data network is a wireless network.

9. Apparatus for use in a server on a data network, the apparatus comprising:
   a cost estimator that operates to compute a multicast cost indicator and a unicast cost indicator that are associated with multicast and unicast transmission of data;
   processing logic that operates to determine a number of unserved terminals when the multicast cost indicator is less than the unicast cost indicator; and
   transmitting logic that operates to transmit a transmission schedule, and multicast the data according to the transmission schedule; and
   wherein the cost estimator operates to recompute the unicast cost indicator based on the number of unserved terminals; and
   wherein the processing logic operates to generate a transmission schedule that describes when the data will be multicasted on the data network, wherein the transmission schedule schedules a first multicast transmission and a second multicast transmission when the multicast cost indicator is less than the computed unicast cost indicator and the recomputed unicast cost indicator.

10. The apparatus of claim 9, wherein the transmitting logic comprises a control channel that is used to transmit the transmission schedule.

11. The apparatus of claim 9, further comprising receiving logic that operates to receive a request to establish a unicast session.

12. The apparatus of claim 9, wherein the processing logic operates to generate the transmission schedule to describe that the data will be multicasted on the data network in a plurality of multicast cycles.

13. The apparatus of claim 9, wherein the transmitter further comprises logic to perform any combination of encoding the data with FEC and interleaving the data.

14. The apparatus of claim 9, wherein the processing logic operates to generate the transmission schedule to describe a time window when a unicast session may be established to retrieve the data when the multicast cost indicator is greater than the unicast cost indicator.

15. The apparatus of claim 9, wherein the data network is a wireless network.

16. An apparatus for use in a server on a data network, the apparatus comprising:
   means for computing a multicast cost indicator and a unicast cost indicator that are associated with multicast and unicast transmission of data;
   means for determining a number of unserved terminals when the multicast cost indicator is less than the unicast cost indicator;
   means for recomputing the unicast cost indicator based on the number of unserved terminals;
   means for generating a transmission schedule that describes when the data will be multicasted on the data network, wherein the transmission schedule schedules a first multicast transmission and a second multicast transmission when the multicast cost indicator is less than the computed unicast cost indicator and the recomputed unicast cost indicator;
   means for transmitting the transmission schedule; and
   means for multicasting the data according to the transmission schedule.

17. The apparatus of claim 16, wherein the means for transmitting the transmission schedule comprises means for transmitting the transmission schedule via a control channel.

18. The apparatus of claim 16, further comprising means for receiving a request to establish a unicast session.

19. The apparatus of claim 16, wherein the means for generating the transmission schedule comprises means for generating the transmission schedule to describe that the data will be multicasted on the data network in a plurality of multicast cycles.

20. The apparatus of claim 16, wherein the means for multicasting further comprises means for performing any combination of encoding the data with FEC and interleaving the data.

21. The apparatus of claim 16, wherein:
the means for generating a transmission schedule generates the transmission schedule to describe a time window when a unicast session may be established to retrieve the data when the multicast cost indicator is greater than the unicast cost indicator.

22. The apparatus of claim 16, wherein the data network is a wireless network.

23. A computer-readable media comprising instructions, which when executed by processing logic in a server, operate to transmit data on a data network, the computer-readable media comprising:
instructions for computing a multicast cost indicator and a unicast cost indicator that are associated with multicast and unicast transmission of data;
instructions for determining a number of unserved terminals when the multicast cost indicator is less than the unicast cost indicator;
instructions for recomputing the unicast cost indicator based on the number of unserved terminals;
instructions for generating a transmission schedule that describes when the data will be multicasted on the data network, wherein the transmission schedule schedules a first multicast transmission and a second multicast transmission when the multicast cost indicator is less than the computed unicast cost indicator and the recomputed unicast cost indicator;
instructions for transmitting the transmission schedule; and
instructions for multicasting the data according to the transmission schedule.

24. The computer-readable media of claim 23, wherein the instructions for transmitting the transmission schedule comprise instructions for transmitting the transmission schedule via a control channel.

25. The computer-readable media of claim 23, further comprising instructions for receiving a request to establish a unicast session.

26. The computer-readable media of claim 23, wherein the instructions for generating the transmission schedule comprise instructions for generating the transmission schedule to describe that the data will be multicasted on the data network in a plurality of multicast cycles.

27. The computer-readable media of claim 23, wherein the instructions for generating the transmission schedule comprises:
instructions for repeating the steps of determining a number of unserved terminals when the multicast cost indicator is less than the unicast cost indicator, and recomputing the unicast cost indicator based on the number of unserved terminals, until the unicast cost indicator is less than the multicast cost indicator; and
instructions for generating the transmission schedule to describe that the data will be multicasted on the data network in the plurality of multicast cycles.

28. The computer-readable media of claim 23, wherein the instructions for multicasting further comprise instructions for performing any combination of encoding the data with FEC and interleaving the data.

29. The computer-readable media of claim 23, further comprising:
instructions for generating the transmission schedule to describe a time window when a unicast session may be established to retrieve the data when the multicast cost indicator is greater than the unicast cost indicator.

30. The computer-readable media of claim 23, wherein the data network is a wireless network.

31. A method for operating a receiving terminal on a data network, the method comprising:
receiving a transmission schedule that describes how data will be transmitted, including a multicast cycle indicator whose value is determined by a server based on a number of unserved receiving terminals, wherein the multicast cycle indicator determines a number of times the server will transmit a multicast transmission;
determining whether the multicast cycle indicator is at an initial value;
attempting to receive multicasted data;
determining whether the multicasted data is received;
decrementing the multicast cycle indicator when the multicasted data is not received; and
repeating determining whether the multicast cycle indicator is at an initial value, attempting to receive multicasted data, determining whether the multicasted data is received, decrementing the multicast cycle indicator when the multicasted data is not received until the multicast cycle indicator is at the initial value.

32. The method of claim 31, wherein the step of receiving comprises receiving the transmission schedule via a control channel.

33. The method of claim 31, further comprising:
failing to receive the data; and
transmitting a request to establish a unicast session to retrieve the data.

34. The method of claim 31, further comprising:
determining that the data is be transmitted to the terminal via a unicast transmission; and
establishing a unicast session to retrieve the data.

35. Apparatus for use in a receiving terminal on a data network, the apparatus comprising:
logic to receive a transmission schedule that describes how data will be transmitted, including a multicast cycle indicator whose value is determined by a server based on a number of unserved receiving terminals, wherein the multicast cycle indicator determines a number of times the server will transmit a multicast transmission;
logic to determine whether the multicast cycle indicator is at an initial value;
logic to attempt to receive multicasted data;
logic to determine whether the multicasted data is received;
logic to decrement the multicast cycle indicator when the multicasted data is not received; and
logic to repeat determining whether the multicast cycle indicator is at an initial value, attempting to receive multicasted data, determining whether the multicasted data is received, decrementing the multicast cycle indicator when the multicasted data is not received until the multicast cycle indicator is at the initial value.

36. The apparatus of claim 35, wherein the logic to receive the transmission schedule comprises logic to receive the transmission schedule via a control channel.

37. The apparatus of claim 35, further comprising:
- logic to determine that the data has not been received; and
- logic to transmit a request to establish a unicast session to retrieve the data.

38. The apparatus of claim 35, further comprising:
- logic to determine that the data is be transmitted to the terminal via a unicast transmission; and
- logic to establish a unicast session to retrieve the data.

39. The method of claim 1 wherein the step of generating the transmission schedule comprises:
- initializing a multicast cycle indicator;
- incrementing the multicast cycle indicator when the multicast cost indicator is less than the unicast cost indicator;
- repeating determining the number of unserved terminals when the multicast cost indicator is less than the unicast cost indicator, recomputing the unicast cost indicator based on the number of unserved terminals, and incrementing the multicast cycle indicator when the multicast cost indicator is less than the unicast cost indicator, until the multicast cost indicator is greater than the unicast cost indicator; and
- including the multicast cycle indicator in the transmission schedule, wherein the multicast cycle indicator sets the number of multicast transmissions.

40. The apparatus of claim 9 wherein the processing logic that operates to generate the transmission schedule comprises:
- processing logic to initialize a multicast cycle indicator;
- processing logic to increment the multicast cycle indicator when the multicast cost indicator is less than the unicast cost indicator;
- processing logic to repeat to determine the number of unserved terminals when the multicast cost indicator is less than the unicast cost indicator, to recompute by the cost estimator the unicast cost indicator based on the number of unserved terminals, and to increment the multicast cycle indicator when the multicast cost indicator is less than the unicast cost indicator, until the multicast cost indicator is greater than the unicast cost indicator; and
- processing logic to include the multicast cycle indicator in the transmission schedule, wherein the multicast cycle indicator sets the number of multicast transmissions.

41. The apparatus of claim 16, wherein means for generating the transmission schedule comprises:
- means for initializing a multicast cycle indicator;
- means for incrementing the multicast cycle indicator when the multicast cost indicator is less than the unicast cost indicator;
- means for repeating determining the number of unserved terminals when the multicast cost indicator is less than the unicast cost indicator, recomputing the unicast cost indicator based on the number of unserved terminals, and incrementing the multicast cycle indicator when the multicast cost indicator is less than the unicast cost indicator, until the multicast cost indicator is greater than the unicast cost indicator; and
- means for including the multicast cycle indicator in the transmission schedule, wherein the multicast cycle indicator sets the number of multicast transmissions.

42. The computer-readable media of claim 23, wherein the instructions for generating the transmission schedule comprise:
- instructions for initializing a multicast cycle indicator;
- instructions for incrementing the multicast cycle indicator when the multicast cost indicator is less than the unicast cost indicator;
- instructions for repeating determining the number of unserved terminals when the multicast cost indicator is less than the unicast cost indicator, recomputing the unicast cost indicator based on the number of unserved terminals, and incrementing the multicast cycle indicator when the multicast cost indicator is less than the unicast cost indicator, until the multicast cost indicator is greater than the unicast cost indicator; and
- instructions for including the multicast cycle indicator in the transmission schedule, wherein the multicast cycle indicator sets the number of multicast transmissions.

* * * * *